(12) United States Patent
Ouchi

(10) Patent No.: US 9,407,889 B2
(45) Date of Patent: Aug. 2, 2016

(54) IMAGE PROCESSING APPARATUS AND IMAGE PROCESSING METHOD FOR WHITE BALANCE CONTROL

(71) Applicant: CANON KABUSHIKI KAISHA, Tokyo (JP)

(72) Inventor: Kenji Ouchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/954,113

(22) Filed: Jul. 30, 2013

(65) Prior Publication Data

US 2014/0036106 A1     Feb. 6, 2014

(30) Foreign Application Priority Data

Aug. 1, 2012   (JP) ................................. 2012-171386

(51) Int. Cl.
*H04N 9/73* (2006.01)

(52) U.S. Cl.
CPC . *H04N 9/73* (2013.01); *H04N 9/735* (2013.01)

(58) Field of Classification Search
CPC ..... H04N 9/735; H04N 5/2354; H04N 9/045; H04N 5/2351; H04N 5/23212; H04N 9/73; H04N 1/40056; H04N 1/6086; H04N 5/23229; H04N 9/873; H04N 1/00801; H04N 2209/046; H04N 5/235

USPC ........ 348/223.1, 224.1, 229.1, 235, 255, 364, 348/371
See application file for complete search history.

(56) References Cited

U.S. PATENT DOCUMENTS 7,852,381 B2    12/2010  Abe
2010/0289962 A1  11/2010  Kim

FOREIGN PATENT DOCUMENTS

| CN | 102387372 A | 3/2012 |
|----|-------------|--------|
| JP | H09-322191 A | 12/1997 |
| JP | 3540485 B2 | 7/2004 |
| JP | 2011-155422 A | 8/2011 |
| JP | 2012-054811 A | 3/2012 |

*Primary Examiner* — Twyler Haskins
*Assistant Examiner* — Padma Haliyur
(74) *Attorney, Agent, or Firm* — Canon USA Inc. IP Division

(57) ABSTRACT

A white balance control circuit calculates a first white balance correction value based on image data captured at light-emission timing of a flash unit and calculate a second white balance correction value based on image data captured at non-emission timing of the flash unit. The white balance control circuit acquires an image capturing condition corresponding to the image data captured at the light-emission timing of the flash unit or scene information obtained from color information of the image data captured at the light-emission timing of the flash unit. The white balance control circuit corrects at least one of the first white balance correction value and the second white balance correction value based on the image capturing condition or the scene information.

8 Claims, 12 Drawing Sheets

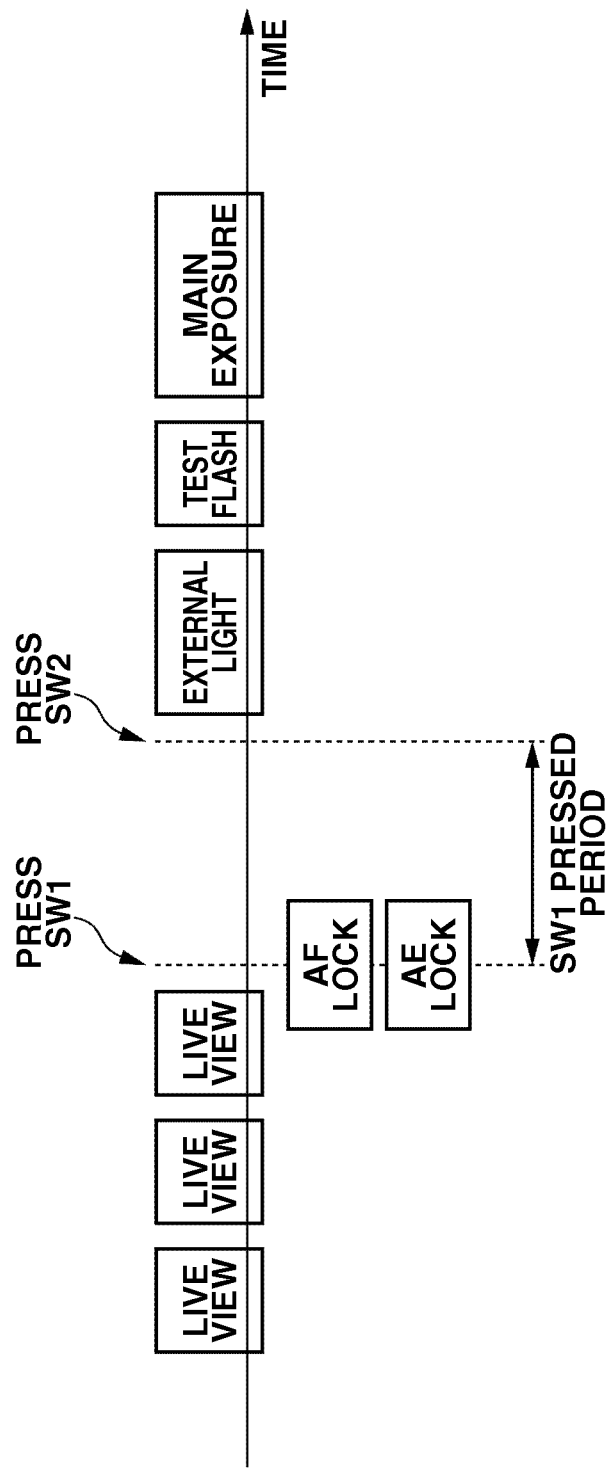

FIG.9

MIXING ADJUSTMENT RATE ACCORDING TO COLOR TEMPERATURE DIFFERENCE AND AMOUNT OF MOVEMENT (UNIT: %)

DIFFERENCE IN COLOR TEMPERATURE →

AMOUNT OF MOVEMENT ↓

| 20 | 20 | 30 | 30 | 40 |
|----|----|----|----|----|
| 30 | 30 | 30 | 30 | 50 |
| 40 | 40 | 40 | 50 | 60 |
| 50 | 50 | 60 | 70 | 70 |
| 60 | 60 | 70 | 70 | 80 |

MIXING ADJUSTMENT RATE ACCORDING TO
SATURATION AND CONTRAST (UNIT: %)

IMAGE PROCESSING APPARATUS AND IMAGE PROCESSING METHOD FOR WHITE BALANCE CONTROL

BACKGROUND OF THE INVENTION

1. Field of the Invention

The present disclosure generally relates to image processing and, more particularly, to a white balance control technique applied to image data.

2. Description of the Related Art

Image capture apparatuses which use an image sensor, such as digital cameras and digital video cameras, have a function called a white balance control function. This function is used for adjusting a color tone of captured image data. There are two types of white balance control, which include manual white balance control and automatic white balance control. According to the manual white balance control, first, an image of a white color object is captured. Then, a white balance coefficient is calculated based on the image, and the obtained calculated white balance coefficient is applied to the entire screen. According to the automatic white balance control, a portion which is assumed to be white is automatically detected from the captured image data. Then, the white balance coefficient is calculated based on a mean value of color components of each color, and the obtained white balance coefficient is applied to the entire screen.

According to the conventional automatic white balance control, if a flash unit flashes in a scene where alight source other than the flash unit exists, a white balance coefficient calculated as described above is applied to the entire screen. Thus, it is difficult to perform the white balance control considering the tint of each light source. For example, if the environment light includes light from a low color temperature light source such as an incandescent light source, a white balance that matches the low color temperature light source cannot be obtained if the white balance is adjusted for the flash light. This is because the flash unit is a high color temperature light source. On the other hand, if the white balance is adjusted for the low color temperature light source, a white balance that matches the flash light cannot be obtained. Further, if the white balance control is performed so that the white balance is adjusted for a medium between the low and the high temperature light sources, since the white balance corresponds to neither of the light sources, the tint of the area lighted by the flash light will be bluish and the area lighted by the low color temperature light source will be reddish.

Under such circumstances, Japanese Patent No. 3540485 discusses a technique useful for controlling the white balance. According to this technique, image data which is captured at the light emission timing of the flash unit is compared with image data which is captured at the non-emission timing of the flash unit for each arbitrary object area and a ratio of the data is obtained. Further, a contribution ratio of the flash light is determined according to the value of the ratio. Then, the white balance control is performed using a white balance control value selected for each object area according to the determined contribution ratio.

However, according to the technique discussed in Japanese Patent No. 3540485, since the development processing is performed after the white balance control value is selected for each area, control such as color reproduction control may not appropriately match the white balance control value.

Further, if the technique discussed in Japanese Patent No. 3540485 is used, there is a time lag between the image data captured at light emission timing of the flash unit and the image data captured at non-emission timing of the flash unit. Thus, when the object is moving or the image capture apparatus itself is moving, a detection error regarding the flash coverage area or the amount of flash light may occur. Accordingly, a shift in tint is likely to occur at the boundary portion of the object. Especially, when an image is captured at high-power zoom, since even a slight motion of the image capture apparatus causes the detection errors of the flash coverage and the amount of flash light, the shift in tint is more likely to occur.

SUMMARY OF THE INVENTION

The present disclosure is directed to an image processing apparatus which can reduce shift in tint at the boundary portion of an object and provide a desirable image for the user.

According to an aspect of the present disclosure, an image processing apparatus includes a correction value calculation unit configured to calculate a first white balance correction value based on image data captured at light-emission timing of a flash unit and to calculate a second white balance correction value based on image data captured at non-emission timing of the flash unit, an acquisition unit configured to acquire an image capturing condition corresponding to the image data captured at the light-emission timing of the flash unit or scene information obtained based on color information of the image data captured at the light-emission timing of the flash unit, a correction value correction unit configured to correct at least one of the first white balance correction value and the second white balance correction value based on the image capturing condition or the scene information, a generation unit configured to generate first image data from the image data captured at the light-emission timing of the flash unit based on the first white balance correction value output from the correction value correction unit and to generate second image data from the image data captured at the non-emission timing of the flash unit based on the second white balance correction value output from the correction value correction unit, a component calculation unit configured to calculate a luminance component of external light and a luminance component of flash light from the flash unit based on a luminance value of the image data captured at the non-emission timing of the flash unit and a luminance value of the image data captured at the light-emission timing of the flash unit, a mixing ratio calculation unit configured to calculate a mixing ratio of the first image data and the second image data based on the luminance component of the external light and the luminance component of the flash light, and a mixing unit configured to mix the first image data and the second image data based on a difference between a luminance component of the first image data and a luminance component of the second image data.

Further features of the present disclosure will become apparent from the following description of exemplary embodiments with reference to the attached drawings

BRIEF DESCRIPTION OF THE DRAWINGS

FIG. 4 illustrates imaging control in time sequence.

FIG. 9 illustrates the mixing adjustment rate corresponding to a color temperature difference and a motion amount.

DESCRIPTION OF THE EMBODIMENTS

Various exemplary embodiments, features, and aspects of the disclosure will be described in detail below with reference to the drawings.

Figure 1:
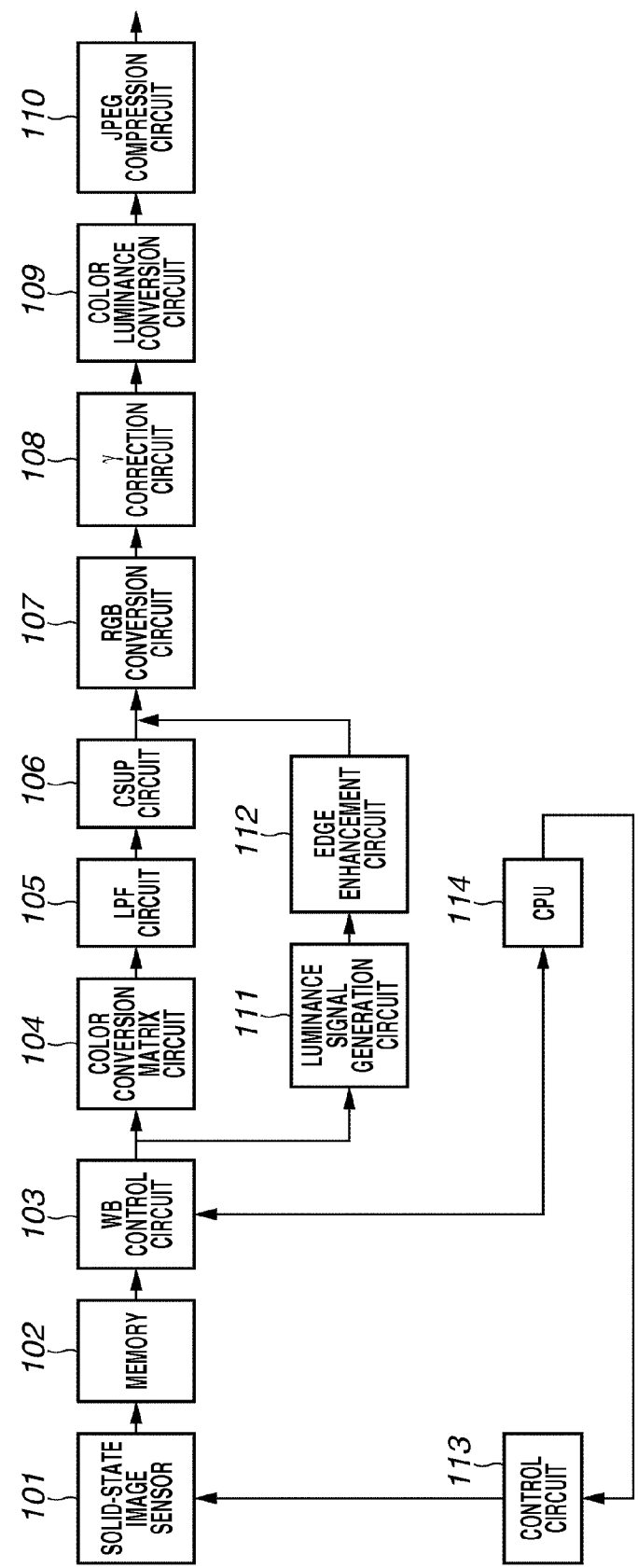
FIG. 1 illustrates a configuration of an image capture apparatus according to a first exemplary embodiment of the present disclosure.

FIG. 1 illustrates a configuration of an image capture apparatus according to a first exemplary embodiment of the present disclosure. The image capture apparatus according to the present embodiment is an application example of an image processing apparatus according to the present disclosure. In FIG. 1, a solid-state image sensor 101 includes a charge-coupled device (CCD) sensor or a complementary metal-oxide semiconductor (CMOS) sensor. The surface of the solid-state image sensor 101 is covered, for example, by a red, green, blue (RGB) color filter such as a Bayer filter so that color imaging can be performed.

A central processing unit (CPU) 114 calculates a shutter speed and an aperture value useful in brightening the entire image. The CPU 114 also calculates a drive amount of the focus lens so that the object in the focusing area is in-focus. The exposure value (shutter speed or aperture value) and the drive amount of the focus lens calculated by the CPU 114 are output to a control circuit 113 so that each of the corresponding components is controlled according to each value. A white balance (WB) control circuit 103 calculates a WB correction value based on the image data stored in a memory 102 and performs WB correction of the image data stored in the memory 102 by using the calculated WB correction value. Details of the calculation method of the WB correction value performed by the WB control circuit 103 will be described below. As used herein, the term "unit" generally refers to any combination of software, firmware, hardware, or other component that is used to effectuate a purpose.

A color conversion matrix circuit 104 adjusts the color gain of the image data which has undergone the WB control of the WB control circuit 103 to reproduce the image data with optimal colors, and converts the data into color difference signals R-Y and B-Y. A low pass filter (LPF) circuit 105 limits bands of the color difference signals R-Y and B-Y. A chroma suppress (CSUP) circuit 106 suppresses a false color signal of a saturated portion from the image data having the band limited by the LPF circuit 105. The image data having the white balance corrected by the WB control circuit 103 is also output to a luminance signal (Y) generation circuit 111, where a luminance signal Y is generated. An edge enhancement circuit 112 performs edge enhancement processing of the generated luminance signal Y.

An RGB conversion circuit 107 converts the color difference signals R-Y and B-Y output from the CSUP circuit 106 and the luminance signal Y output from the edge enhancement circuit 112 into RGB signals. A gamma (γ) correction circuit 108 performs gradation correction of the RGB signals. A color luminance conversion circuit 109 converts the gradation-corrected RGB signals into YUV signals. A Joint Photographic Experts Group (JPEG) compression circuit 110 compresses the YUV signals. The signals output from the JPEG compression circuit 110 are recorded as image data on an external recording medium or an internal recording medium.

Figure 2:
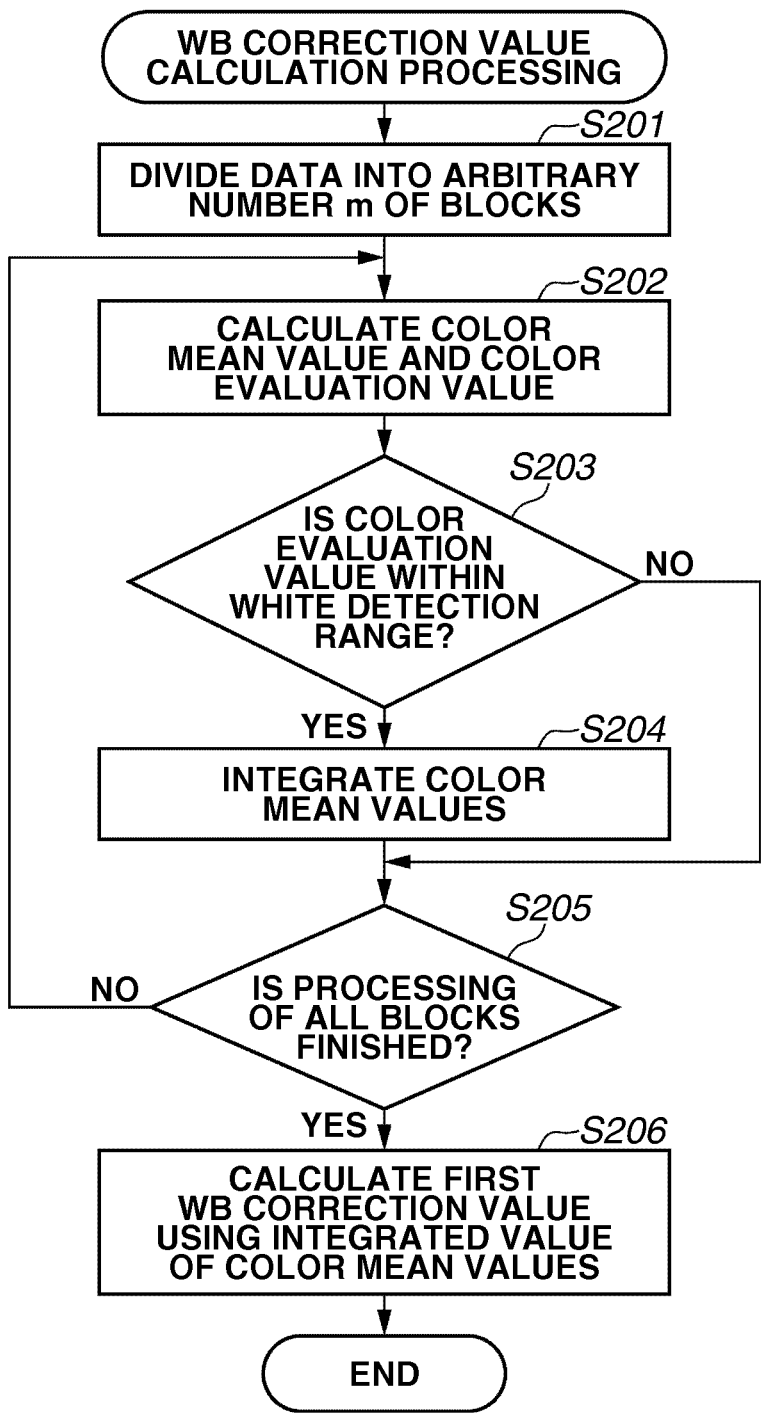
FIG. 2 is a flowchart illustrating calculation processing of a white balance (WB) correction value.

Next, a method for calculating a WB correction value performed by the WB control circuit 103 will be described in detail. First, a method for calculating a first WB correction value (first white balance correction value) which is used for correcting the white balance when the main exposure is performed (at the light emission timing of the flash unit) will be described with reference to the flowchart illustrated in FIG. 2. The first WB correction value is calculated based on image data which is captured at the light emission timing of the flash unit (hereinafter referred to as image data captured with flash). Processing illustrated in FIG. 2 is an example of processing performed by a calculation unit.

In step S201, the WB control circuit 103 reads out the image data captured with flash by a flash unit stored in the memory 102 and divides the image data into a predetermined number m of blocks. In step S202, the WB control circuit 103 adds and averages pixel values for respective colors for blocks (1 to m), and calculates a mean color value (R[i], G[i], and B[i]). Further, the WB control circuit 103 calculates a color evaluation value (Cx[i], Cy[i]) according to the expressions below.

$$Cx[i]=(R[i]-B[i])/Y[i]\times 1024$$

$$Cy[i]=(R[i]+B[i]-2G[i])/Y[i]\times 1024$$

where $Y[i]=(R[i]+2G[i]+B[i])/4$

Figure 3A:
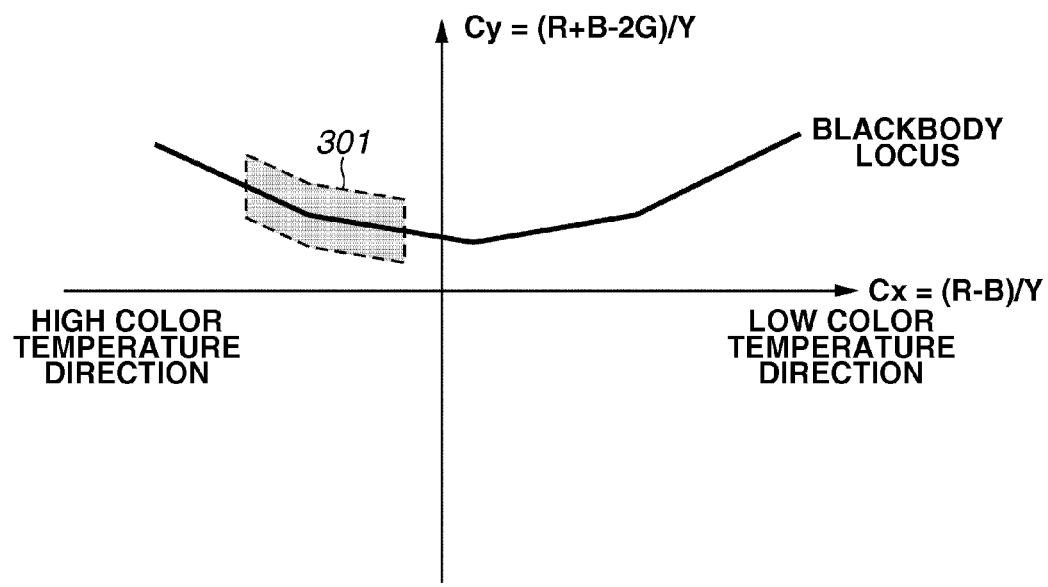
FIGS. 3A and 3B illustrate a white detection area.

The WB control circuit 103 performs white detection using a graph having coordinate axes as illustrated in FIG. 3A. The negative direction of the x coordinate (Cx) represents the color evaluation value when a white color of a high color temperature object is captured and the positive direction represents the color evaluation value when a white color of a low color temperature object is captured. Further, the y coordinate (Cy) indicates a degree of a green component of the light source. The green component is greater toward the negative direction of the y coordinate. If the green component is large, it means that the light is fluorescent.

In step S203, the WB control circuit 103 determines whether the color evaluation value (Cx[i], Cy[i]) of the i-th block calculated in step S202 is within a white detection range 301 which is determined in advance (see FIG. 3A). Since the flash unit is a known light source, the detection range of the white detection range 301 is limited. If the color evaluation value (Cx[i], Cy[i]) of the i-th block is within the white detection range 301 (YES in step 203), the processing proceeds to step S204. On the other hand, if the color evaluation value (Cx[i], Cy[i]) of the i-th block is not within the white detection range 301 (NO in step S203), the processing skips step S204 and proceeds to step S205.

In step S204, the WB control circuit 103 determines that the i-th block is white and integrates the color mean value (R[i], G[i], B[i]) of the block. The processing in steps S203 and S204 can be expressed by the following expressions:

$$SumR = \sum_{i=0}^{m} Sw[i] \times R[i]$$

$$SumG = \sum_{i=0}^{m} Sw[i] \times G[i]$$

$$SumB = \sum_{i=0}^{m} Sw[i] \times B[i]$$

According to the above-described expressions, if the color evaluation value (Cx[i], Cy[i]) is within the white detection range 301, Sw[i] is set to 1. If the color evaluation value (Cx[i], Cy [i]) is not within the white detection range 301, Sw[i] is set to 0. In steps S203 and S204, whether the color mean value (R[i], G[i], B[i]) is to be integrated is substantially determined.

In step S205, the WB control circuit 103 determines whether the above-described processing has been performed for all the blocks. If any unprocessed block exists (NO in step S205), the processing returns to step S202, and the above-described processing is repeated. On the other hand, if the processing of all the blocks is completed (YES in step S205), the processing proceeds to step S206.

In step S206, the WB control circuit 103 calculates a first WB correction value (WBCol_R1, WBCol_G1, WBCol_B1) by using an integrated value (SumR1, SumG1, SumB1) of the color mean value according to the expressions below:

WBCol_$R$1=Sum$Y$1×1024/Sum$R$1

WBCol_$G$1=Sum$Y$1×1024/Sum$G$1

WBCol_$B$1=Sum$Y$1×1024/Sum$B$1 where SumY1=(SumR1+2×SumG1+SumB1)/4

A WB correction value of the flash light can be set in advance as a known first WB correction value.

Next, calculation processing of a second WB correction value (second white balance correction value) used for correcting the white balance at the non-emission timing of the flash unit will be described. The second WB correction value is calculated based on the image data which is captured at the non-emission timing of the flash unit (hereinafter referred to as image data captured without flash). FIG. 4 illustrates the imaging control in time sequence. As illustrated in FIG. 4, live view image data is captured at regular intervals before a switch SW1 is pressed. When the switch SW1 is pressed, autofocus (AF) lock and auto exposure (AE) lock are performed. Further, a test emission and main exposure are performed after a switch SW2 is pressed. In the description below, image data exposed and captured at timing corresponding to "external light" in FIG. 4 before the test emission corresponds to the image data captured without flash. As another example of the image data captured without flash, image data exposed and captured after the main exposure can also be used.

Figure 3B:
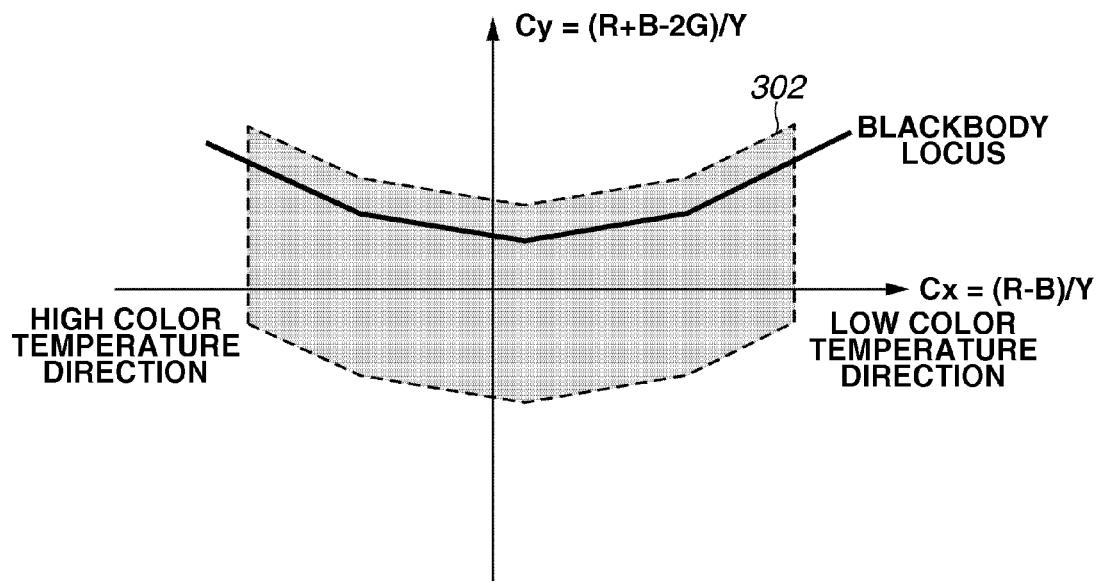
Figure 5:
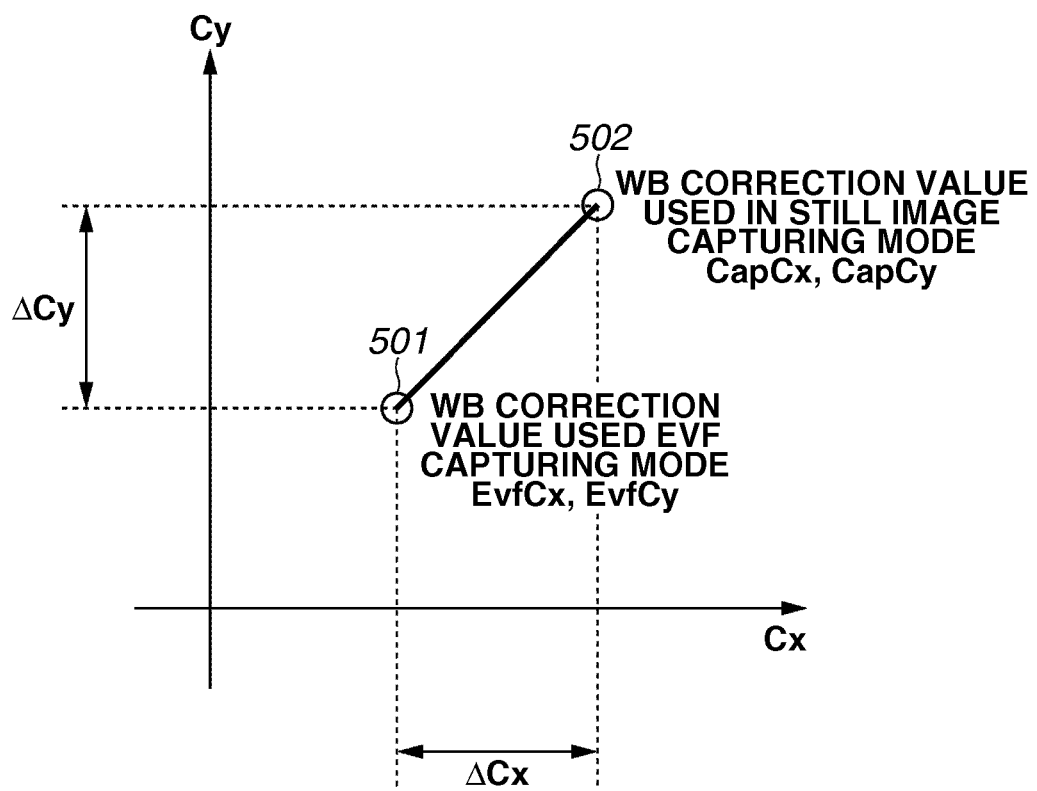
FIG. 5 illustrates a WB correction value in a still image capturing mode and a WB correction value in an electronic viewfinder (EVF) imaging mode.

Calculation processing of the second WB correction value is performed by a method similar to the calculation processing of the above-described first WB correction value. However, it is different from the calculation processing of the first WB correction value in that it is processed based on a white detection range for external light such as a white detection range 302 illustrated in FIG. 3B. This is because the external light is not a known light source unlike the flash unit. Accordingly, the white detection range 302 cannot be limited as the white detection range 301 corresponding to the light emission timing of the flash unit. The white detection range 302 for external light is determined by capturing white color in different light source conditions in advance, calculating color evaluation values, and plotting the obtained color evaluation values. The range of the white detection range 302 can be changed according to an image capturing mode of the image capture apparatus. The second WB correction value can be applied to the image capture apparatus in a different image capturing mode. For example, the WB correction value calculated in the past and used in an electronic viewfinder (EVF) image capturing mode can be used as the second WB correction value. However, if a disperse difference occurs according to the image capturing mode, the WB control circuit 103 corrects the WB correction value. FIG. 5 illustrates the WB correction values in a still image capturing mode and the EVF image capturing mode. In calculating the WB correction value used in the still image capturing mode by using the WB correction value used in the EVF image capturing mode and which has been calculated in the past, as illustrated in FIG. 5, the WB control circuit 103 corrects a WB correction value (EvfCx, EvfCy) 501 in the EVF image capturing mode by ΔCx and ΔCy. Accordingly, a WB correction value (CapCx, CapCy) 502 in the still image capturing mode is calculated.

Figure 6:
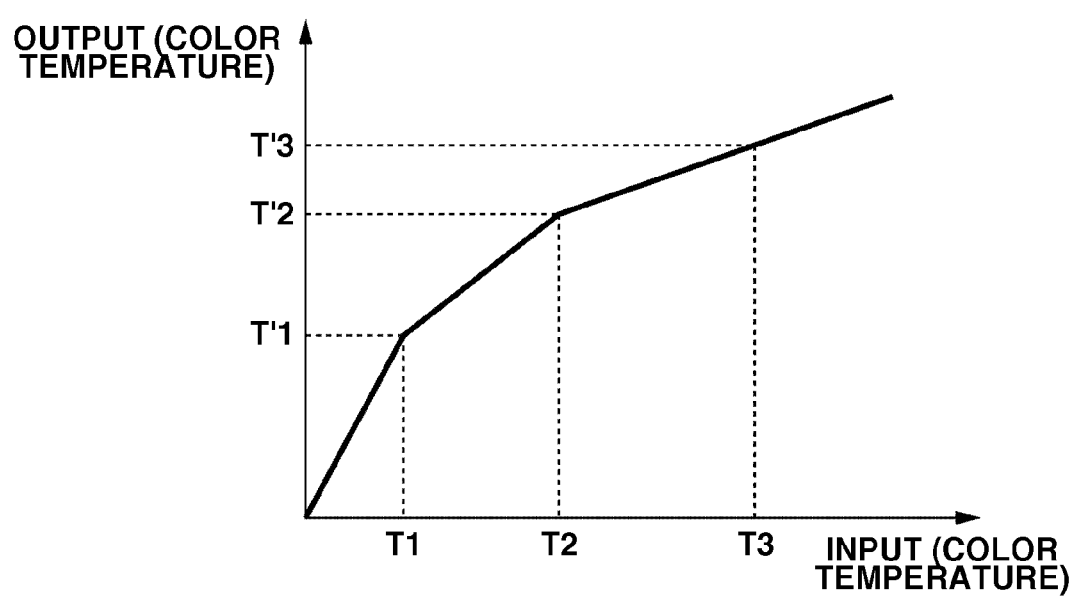
FIG. 6 is a graph illustrating a method for calculating a second WB correction value considering the tint of the ambient atmosphere.

If a low color temperature light source such as an incandescent light source is used in the background, considering the ambient atmosphere, the second WB correction value can be calculated so that the tint of the image remains. For example, as illustrated in FIG. 6, if the color temperature of the second WB correction value is low (e.g., input T1), by controlling the apparatus so that the tint of the image remains (e.g., output T'1), image data with a reddish tint of the incandescent light source can be generated.

Figure 7:
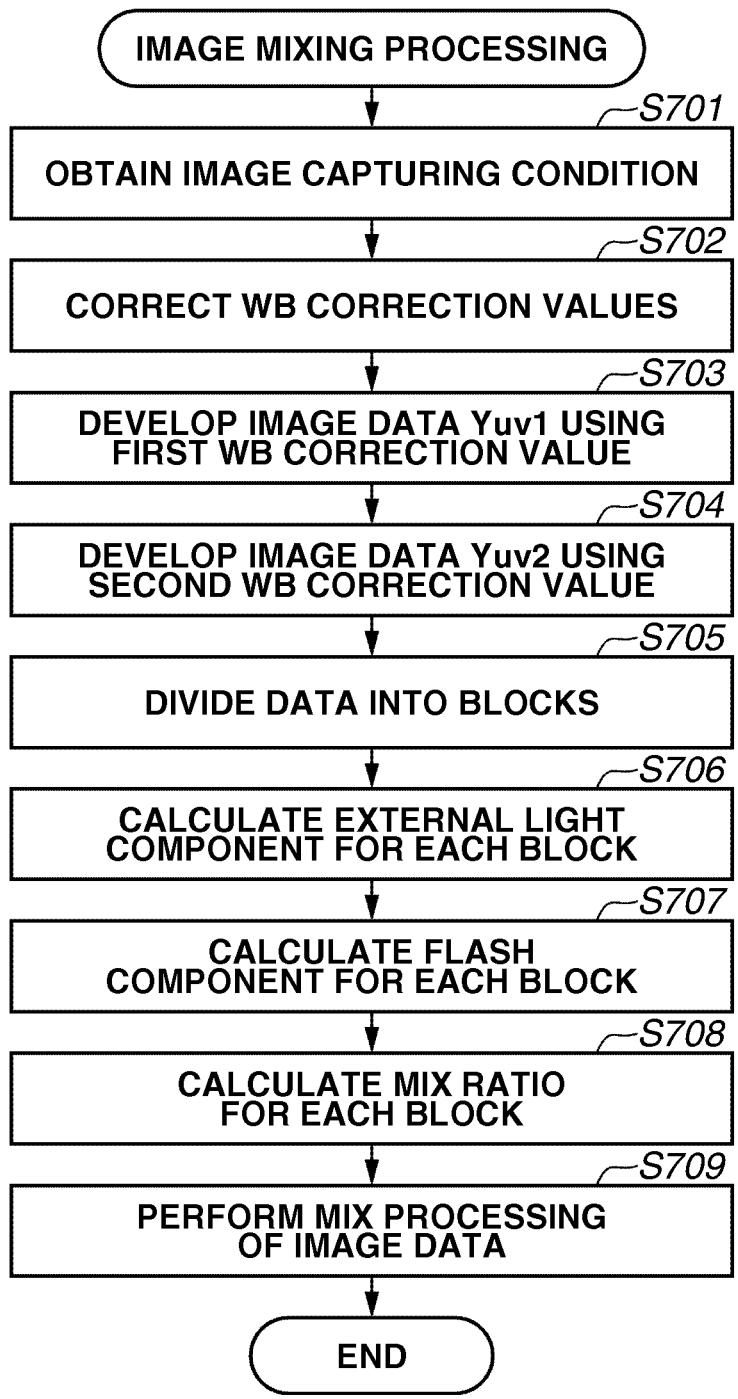
FIG. 7 is a flowchart illustrating mixing processing of image data according to the first exemplary embodiment.

Next, with reference to FIG. 7, mixing processing of the image data will be described. In step S701, the WB control circuit 103 (acquisition unit) acquires an image capturing condition. The image capturing condition is, for example, a focal length of the photographic lens, an object distance, a guide number of the flash unit, or an International Organization for Standardization (ISO) film speed when the image data is captured with flash. The image capturing condition can be any one of such conditions or a combination of the conditions. Step S701 is a processing example of an acquisition unit.

Figure 8:
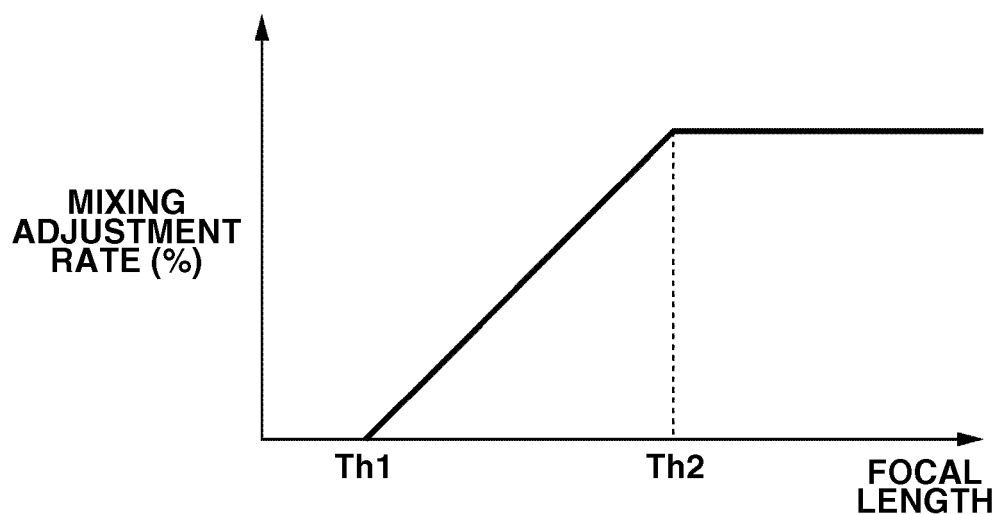
FIG. 8 illustrates a relation between a focal length and a mixing adjustment rate.

In step S702, the WB control circuit 103 (correction unit) corrects the first WB correction value and the second WB correction value based on the image capturing condition obtained in step S701. Step S702 is a processing example of a correction value correction unit. If the focal length is the only image capturing condition, a mixing adjustment rate which corresponds to the focal length is calculated according to a graph showing the relation between the focal length and the mixing adjustment rate illustrated in FIG. 8. If the image capturing condition is the object distance, the guide number of the flash unit, or the ISO film speed, the mixing adjustment rate that corresponds to the image capturing condition is calculated according to a similar method. Data showing the relation between the image capturing condition and the mixing adjustment rate, such as the one illustrated in FIG. 8, is stored in a recording medium (not illustrated) and read out from the recording medium by the WB control circuit 103 as needed.

In this manner, the WB correction value can be determined while considering whether the flash actually covers the object by calculating the mixing adjustment rate according to the image capturing condition such as the focal length, the object distance, the guide number of the flash unit, or the ISO film speed. Especially, if the focal length is used as the image capturing condition, camera shake that tends to occur at high-power zoom can be considered. Thus, even if the amount of camera shake is so small that it can hardly be detected, the occurrence of shift in tint at the boundary portion of the object due to the detection error of the flash coverage range and the amount of flash light can be prevented.

In step S702, by using the mixing adjustment rate, the WB control circuit 103 (a color temperature difference calculation unit) corrects the first WB correction value (WBCol_R1, WBCol_G1, WBCol_B1) and the second WB correction value (WBCol_R2, WBCol_G2, WBCol_B2) as follows:

$$WBCol\_R1=WBCol\_R1+(WBCol\_R2-WBCol\_R1)\times 0.5\times\text{mixing adjustment rate}$$

$$WBCol\_G1=WBCol\_G1+(WBCol\_G2-WBCol\_G1)\times 0.5\times\text{mixing adjustment rate}$$

$$WBCol\_B1=WBCol\_B1+(WBCol\_B2-WBCol\_B1)\times 0.5\times\text{mixing adjustment rate}$$

$$WBCol\_R2=WBCol\_R2+(WBCol\_R1-WBCol\_R2)\times 0.5\times\text{mixing adjustment rate}$$

$$WBCol\_G2=WBCol\_G2+(WBCol\_G1-WBCol\_G2)\times 0.5\times\text{mixing adjustment rate}$$

$$WBCol\_B2=WBCol\_B2+(WBCol\_B1-WBCol\_B2)\times 0.5\times\text{mixing adjustment rate}$$

As shown above, the difference between the first WB correction value and the second WB correction value decreases as the mixing adjustment rate increases. In the example above, although both the first WB correction value and the second WB correction value are corrected, either the first WB correction value or the second WB correction value can be corrected as a different exemplary embodiment. In this case, while one of the WB correction values is fixed, the other WB correction value is corrected so that it is closer to the fixed WB correction value.

Further, the WB control circuit 103 (a color temperature difference calculation unit and a motion amount calculation unit) calculates the difference in color temperature between the first WB correction value being the WB correction value at the light emission timing of the flash unit and the second WB correction value being the WB correction value at the non-emission timing of the flash unit and the motion amount of the object or the image capture apparatus. Then, the WB control circuit 103 calculates a first mixing adjustment rate based on the color temperature difference and the motion amount, and uses the obtained first mixing adjustment rate in calculating the final mixing adjustment rate. The processing for calculating the above-described color temperature difference is a processing example of a color temperature difference calculation unit. Further, the processing for calculating the motion amount of the above-described object or the image capture apparatus is a processing example of a motion amount calculation unit.

As a method for calculating the above-described motion amount, there is a method using the difference between the image data captured with flash and the image data captured without flash. In other words, it is a method that calculates the above-described motion amount by performing signal processing of the image data captured with and without flash, extracting luminance edge signals, and obtaining a difference between the luminance edge signals.

As a different calculation method of the motion amount, there is a method that uses angular velocity information obtained from a gyroscopic sensor in the WB control circuit 103. The angular velocity information is, for example, calculated by obtaining an average value of the angular velocity information periodically obtained during the main exposure (flash unit flashing) period. Either of the calculation methods of the motion amount can be employed. Further, the final motion amount can be calculated based on the calculation results of the motion amounts.

The first mixing adjustment rate can be calculated by using the color temperature difference and the motion amount obtained as described above and by referencing the two-dimensional table illustrated in FIG. 9. Data that defines the mixing adjustment rate corresponding to the color temperature difference and the motion amount such as the one illustrated in FIG. 9 is stored in a recording medium (not illustrated) and read out from the recording medium by the WB control circuit 103 as needed.

If the mixing adjustment rate obtained from the image capturing condition is set as a second mixing adjustment rate, a final mixing adjustment rate can be calculated based on the first mixing adjustment rate and the second mixing adjustment rate as described below.

mixing adjustment rate=first mixing adjustment rate+
(1−first mixing adjustment rate)×second mixing
adjustment rate In step S703, by using the first WB correction value, the WB control circuit 103 (a generation unit) generates (develops) image data Yuv1 from image data captured with flash. The image data Yuv1 is an example of first image data. In step S704, by using the second WB correction value, the WB control circuit 103 generates (develops) image data Yuv2 from image data captured without flash. The image data Yuv2 is an example of second image data. In step S705, the WB control circuit 103 divides the image data captured with flash, the image data captured without flash, the image data Yuv1, and the image data Yuv2 into a number n of blocks. Steps S703 and S704 are processing examples of the generation unit.

In step S706, the WB control circuit 103 (a component calculation unit) calculates a color mean value (R2[$i$], G2[$i$], B2[$i$]) by adding and averaging the pixel value of each color for each block (1 to n) of the image data captured without flash, and calculates a luminance value a[i] of each block. The expression for calculating the luminance value a[i] of each block is given below. The calculated luminance value a[i] of each block is used as a luminance component of external light of each block (hereinafter referred to as an external light component).

$$a[i]=0.3*R2[i]+0.6*G2[i]+0.1*B2[i]$$

In step S707, the WB control circuit 103 calculates the luminance value a[i] of each block from the image data captured without flash as well as calculates a color mean value (R1[$i$], G1[$i$], B1[$i$]) by averaging the pixel values for each color for each block (1 to n) of the image data captured with flash, and calculates a luminance value b[i] of each block. Further, as shown in the expression below, the WB control circuit 103 calculates a luminance value (flash component) c[i] of a flash component of each block by subtracting, from the luminance value a[i] of each block of the image data captured without flash, the calculated luminance value b[i] of a corresponding block.

$$c[i]=b[i]-a[i]$$

Steps S706 and S707 are processing examples of a component calculation unit.

In step S708, the WB control circuit 103 (a mixing ratio calculation unit) calculates a mix ratio α[i] of each block which is used when the image data Yuv1 and the image data Yuv2 are mixed based on a ratio of the flash component c[i] and the external light component a [i] of the corresponding block according to the following expression:

$$\alpha[i]=c[i]/(a[i]+c[i])$$

Step S708 is a processing example of a mixing ratio calculation unit.

In step S709, by using the mix ratio α[i] of each block, the WB control circuit 103 (a mixing unit) generates mixed image data Yuv3 by mixing the image data Yuv1 and the image data Yuv2. A color evaluation value (Y3[$i$], u3[$i$], v3[$i$]) of the mixed image data Yuv3 is calculated according to the following equations by using a color evaluation value (Y1[$i$], u1[$i$], v1[$i$]) of the image data Yuv1 and a color evaluation value (Y2[$i$], u2[$i$], v2[$i$]) of the image data Yuv2. Step S709 is a processing example of a mixing unit.

$$Y3[i]=Y1[i]*\alpha[i]+Y2[i]*(1-\alpha[i])$$

$$u3[i]=u1[i]*\alpha[i]+u2[i]*(1-\alpha[i])$$

$$v3[i]=v1[i]*\alpha[i]+v2[i]*(1-\alpha[i])$$

In order to reduce the shift in tint at the boundary portion of each block, a mix ratio α'[j] for each pixel can be calculated from the mix ratio α[i] for each block by performing pixel interpolation processing in step S708. In this case, for example, bilinear interpolation can be used for the pixel interpolation processing. Then, in step S709, the WB control circuit 103 generates mixed image data Yuv3 by mixing the image data Yuv1 and the image data Yuv2 by using the mix ratio α'[j] for each pixel. A color evaluation value (Y3[$j$], u3[$j$], v3[$j$]) of the mixed image data Yuv3 is calculated according to the equations below by using a color evaluation value (Y1[$j$], u1[$j$], v1[$j$]) of the image data Yuv1 and a color evaluation value (Y2[$j$], u2[$j$], v2[$j$]) of the image data Yuv2.

$$Y3[j]=Y1[j]*\alpha'[j]+Y2[j]*(1-\alpha'[j])$$

$$u3[j]=u1[j]*\alpha'[j]+u2[j]*(1-\alpha'[j])$$

$$v3[j]=v1[j]*\alpha'[j]+v2[j]*(1-\alpha'[j])$$

Further, in step S709, processing can be changed depending on the determination of whether mixing processing of image data is to be performed for each block according to the luminance of each block of the image data captured with flash. In other words, if the luminance of the block is low or high, the mixing processing of the block is not performed and the generation (development) processing of the image data is performed using the WB correction value which is calculated according to the normal white balance control described below. If the luminance of the block is neither high nor low, processing similar to the mixing processing of image data described above is performed.

Next, a normal white balance control method will be described in detail. First, the WB control circuit 103 calculates the first and the second WB correction values according to processing similar to the above-described calculation processing of the WB correction value. Next, the WB control circuit 103 performs mix (weighted addition) processing of the first and the second WB correction values. According to the mix (weighted addition) processing, weighted addition of the external light and the flashlight is performed by using the emission ratio.

Figure 10:
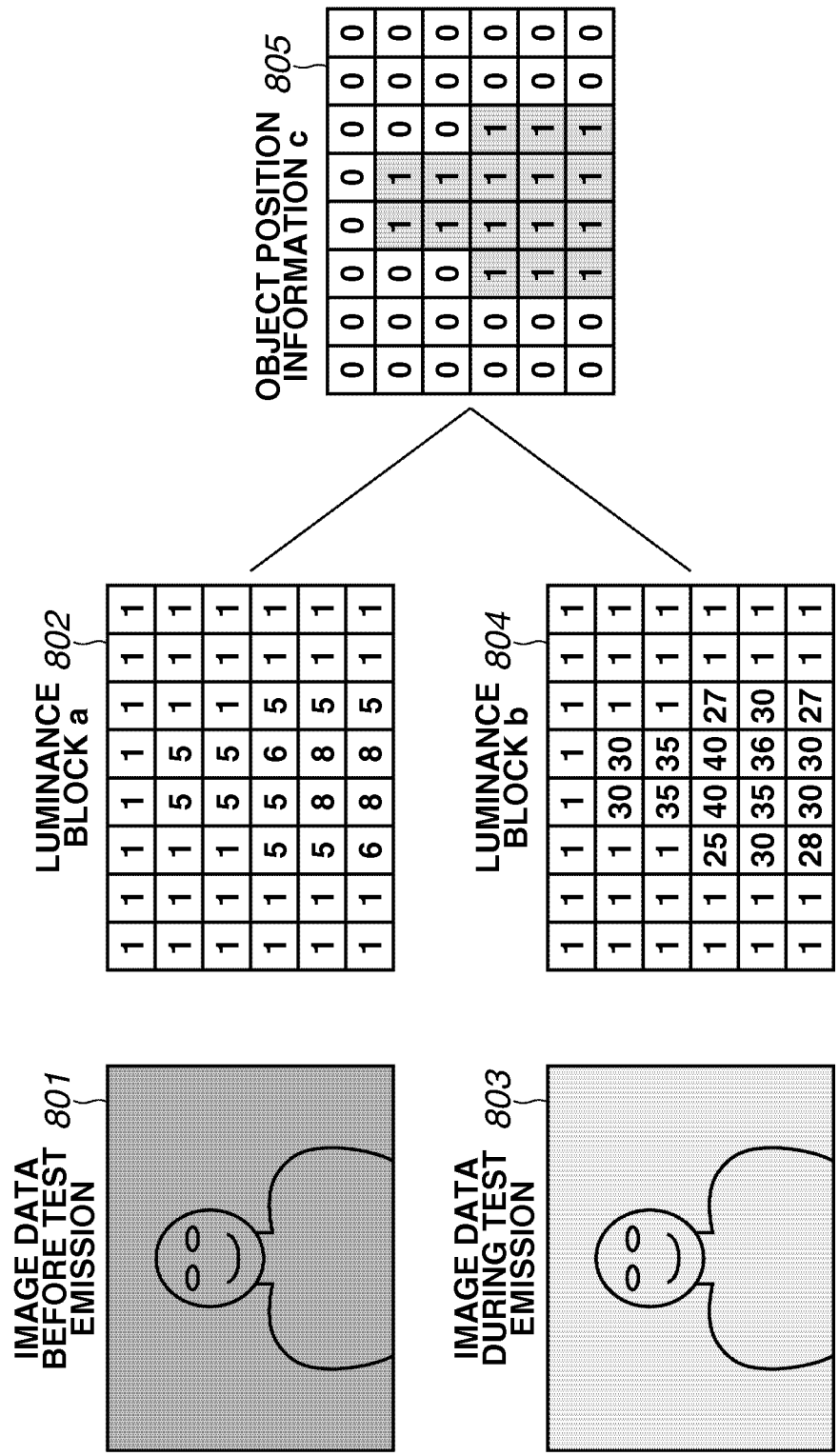
FIG. 10 illustrates clipping of an object area for calculating an emission ratio.

Next, clipping of the object area for calculating the emission ratio will be described with reference to FIG. 10. The WB control circuit 103 obtains image data 801 which is captured before the test emission, and calculates a luminance block "a" 802 having a matrix of m×n pixels from the image data 801.

Next, according to a test emission of the flash unit under the same condition as the condition set before the test emission, the WB control circuit 103 obtains image data 803. Further, the WB control circuit 103 obtains a luminance block "b" 804 having a matrix of m×n pixels from the image data 803 which is captured at the time of test emission. The luminance block "a" 802 and the luminance block "b" 804 are temporarily stored in a RAM of the image capture apparatus. The background of the image data 801 which is captured before the test emission is regarded as approximately the same as the background of the image data 803 which is captured at the time of test emission. Thus, the difference in data between the luminance block "a" 802 and the luminance block "b" 804 corresponds to the light reflected from the object area at the time of test emission of the flash unit, and object position information "c" 805 can be obtained from the difference in data.

The WB control circuit 103 obtains an object position block with a value "1" from the object position information "c" 805 obtained in this manner, and further calculates a luminance value Y1 and a luminance value Y2 of the obtained object position block with the value "1". The luminance value Y1 is a value at the light emission timing of the flash unit and the luminance value Y2 is a value at the non-emission timing of the flash unit. If the exposure condition at the light emission timing of the flash unit is different from the exposure condition at the non-emission timing of the flash unit, the WB control circuit 103 calculates the luminance values Y1 and Y2 under the same exposure condition. The WB control circuit 103 performs the mix processing (weighted addition) by using the first WB correction value and the second WB correction value and according to the emission ratio of the light emitted to the object. The emission ratio is a ratio of the luminance values Y1 and Y2 calculated as described above. Then, the WB control circuit 103 determines the WB correction value obtained according to the mix processing as the WB correction value to be used for the WB processing, and generates (develops) image data which is the final image data.

According to the present embodiment, if appropriate tint of the object and the background is desired when flash light is used, by considering an easy-to-correct image capturing condition in advance, the shift in tint which is likely to occur at the boundary portion of the object when the object or the image capture apparatus moves can be reduced. Thus, the user can capture a desirable image. Further, it is not necessary to limit the difference in the WB correction values applied to the object and the background within a predetermined range in case the object or the image capture apparatus moves. Thus, according to the present embodiment, if the object and the image capture apparatus do not move, it is possible to provide an optimum tint for the object and the background.

Next, a second exemplary embodiment of the present disclosure will be described. The configurations of the image capture apparatus according to the second exemplary embodiment are similar to those of the image capture apparatus according to the first exemplary embodiment illustrated in FIG. 1. Thus, alphanumeric characters in FIG. 1 are used in the description below. Further, in the following description, the difference between the first and the second exemplary embodiments is mainly described.

Figure 11:
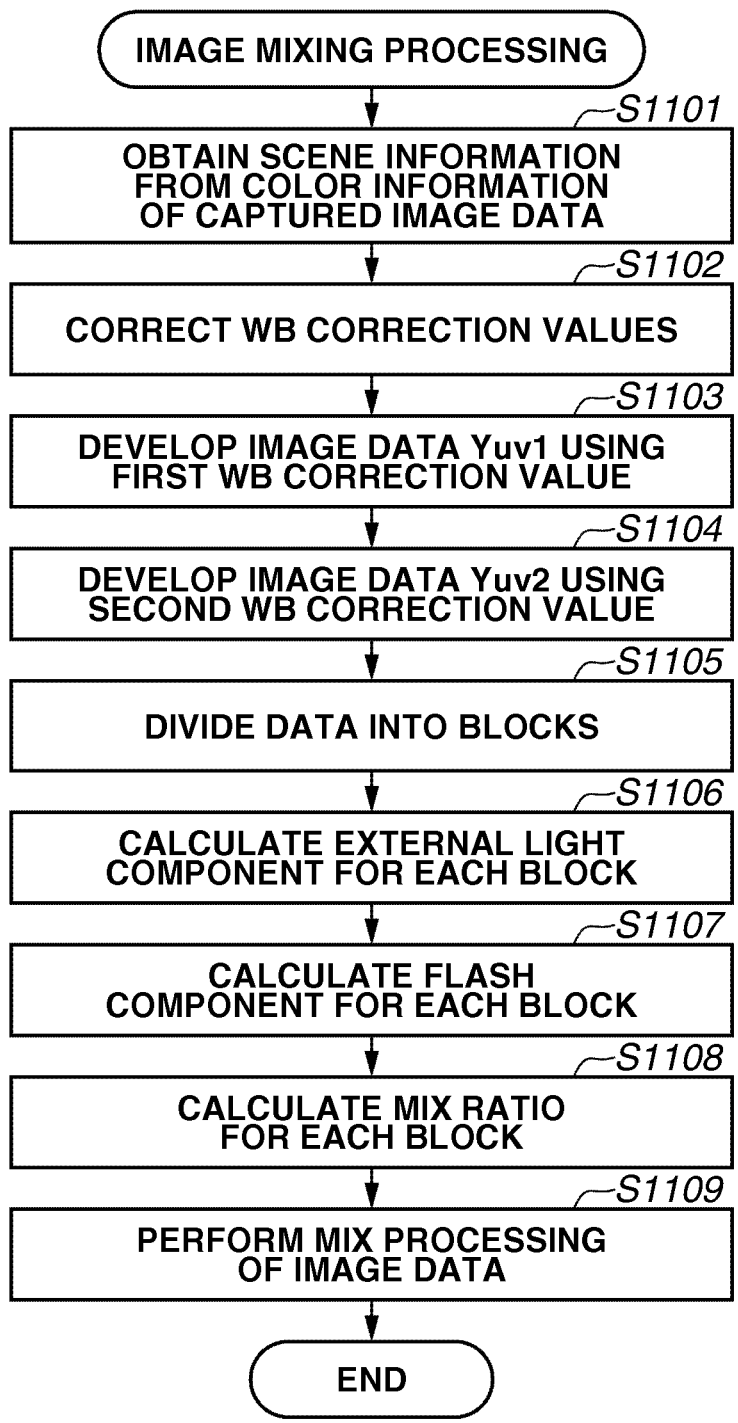
FIG. 11 is a flowchart illustrating mixing processing of image data according to a second exemplary embodiment of the present disclosure.

Mixing processing of image data according to the second exemplary embodiment will be described with reference to FIG. 11. Since the processing in steps S1103 to S1109 in FIG. 11 is similar to the processing in steps S703 to S709 in FIG. 7, the description of the processing is not repeated.

In step S1101, the WB control circuit 103 obtains scene information from color information of the captured image data. The scene information is saturation or contrast of the image data captured with flash. According to the present embodiment, at least one of saturation and contrast of the image data captured with flash is used.

Figure 12:
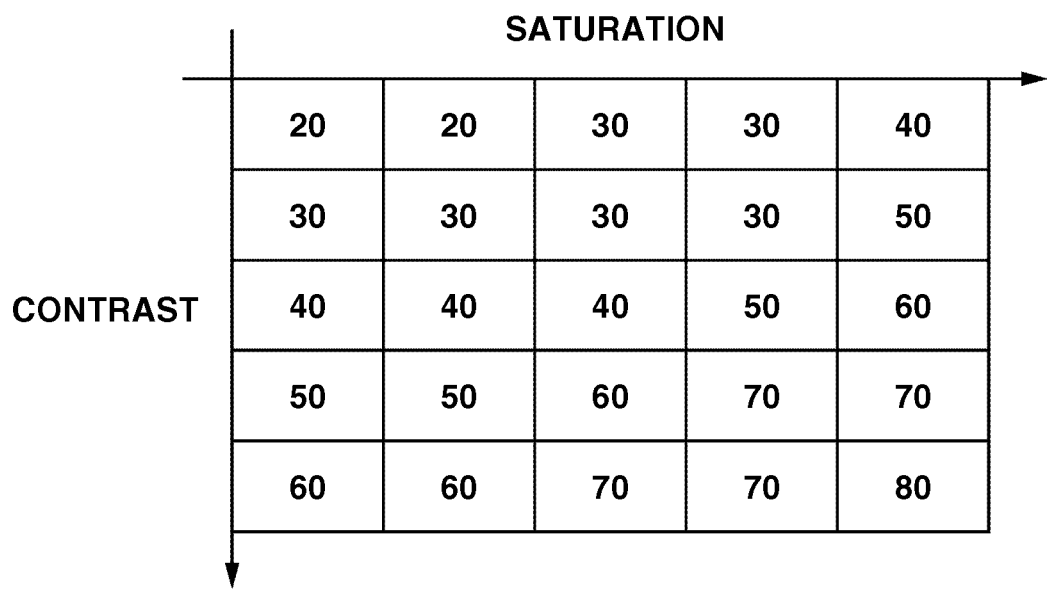
FIG. 12 illustrates the mixing adjustment rate corresponding to saturation and contrast.

In step S1102, the WB control circuit 103 corrects the first WB correction value and the second WB correction value by using the mixing adjustment rate which corresponds to the obtained scene information. The above-described mixing adjustment rate can be acquired by referring to the two-dimensional table of the saturation and contrast as the scene information illustrated in FIG. 12. Data that defines the mixing adjustment rate that corresponds to the scene information such as the data illustrated in FIG. 12 is stored in a recording medium (not illustrated) and read out from the recording medium by the WB control circuit 103 as needed. The correction method of the first WB correction value and the second WB correction value using the mixing adjustment rate is similar to the method described according to the first exemplary embodiment.

As is with the first exemplary embodiment, a ratio of the flash component and the external light component for each corresponding block is obtained from the image data captured without flash and image data captured with flash, and the mix ratio $\alpha[i]$ for each block is calculated according to the second exemplary embodiment. Thus, if a detection error of the flash coverage of the flash light or the amount of flash light occurs, it may result in a shift in tint at the boundary portion of the object. Thus, in a case where a camera shake occurs when an image of a black object in a white background is captured, even if the object is at a distance where the flash light does not reach, the black portion of the image data when the image data has been captured without flash may become white at the light emission timing of the flash unit. Accordingly, it is incorrectly determined that the object is within the flash coverage. However, according to the second exemplary embodiment, since the WB correction value is corrected according to the saturation or contrast, even if the saturation is low or the contrast is high, the detection error of the emission range of the flash light or the amount of flash light can be prevented. Accordingly, the occurrence of shift in tint at the boundary portion of the object can be prevented.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-171386 filed Aug. 1, 2012, which is hereby incorporated by reference herein in its entirety.

What is claimed is:

1. An image processing apparatus comprising:
   a calculation unit configured to calculate a first white balance correction value based on image data captured at light-emission timing of a flash unit and to calculate a second white balance correction value based on image data captured at non-emission timing of the flash unit;
   an acquisition unit configured to acquire a focal length of a photographic lens corresponding to the image data captured at the light-emission timing of the flash unit;
   a correction unit configured to correct at least one of the first white balance correction value and the second white balance correction value so that a difference between the first white balance correction value and the second white balance correction value decreases as the focal length of the photographic lens increases;
   a generation unit configured to generate first image data from the image data captured at the light-emission timing of the flash unit based on the first white balance correction value output from the correction unit and to generate second image data from the image data captured at the non-emission timing of the flash unit based on the second white balance correction value output from the correction unit;
   a component calculation unit configured to calculate a luminance component of external light and a luminance component of light from the flash unit based on a luminance value of the image data captured at the non-emission timing of the flash unit and a luminance value of the image data captured at the light-emission timing of the flash unit; and
   a mixing unit configured to mix the first image data and the second image data based on a ratio of the luminance component of external light and the luminance component of light from the flash unit.

2. The image processing apparatus according to claim 1, further comprising:
   a color temperature difference calculation unit configured to calculate a difference in color temperature of the first white balance correction value and the second white balance correction value; and
   a motion amount calculation unit configured to calculate a motion amount of an object or an image capture apparatus,
   wherein the correction unit corrects at least one of the first white balance correction value and the second white balance correction value further based on the difference in color temperature and the motion amount.

3. The image processing apparatus according to claim 1, wherein, based on the luminance component of the external light and the luminance component of the light from the flash unit for each block, the mixing unit calculates a mixing ratio of the first image data and the second image data for each block.

4. The image processing apparatus according to claim 3, wherein the mixing unit calculates a mixing ratio for each pixel from the mixing ratio for each block using pixel interpolation processing.

5. The image processing apparatus according to claim 1, wherein the mixing unit determines whether to execute mixing processing of a corresponding block according to a luminance value of each block.

6. An image processing method executed by an image processing apparatus, the image processing method comprising:

calculating a first white balance correction value based on image data captured at light-emission timing of a flash unit and calculating a second white balance correction value based on image data captured at non-emission timing of the flash unit;

acquiring a focal length of a photographic lens corresponding to the image data captured at the light-emission timing of the flash unit;

correcting at least one of the first white balance correction value and the second white balance correction value so that a difference between the first white balance correction value and the second white balance correction value decreases as the focal length of the photographic lens increases;

generating first image data from the image data captured at the light-emission timing of the flash unit based on the corrected first white balance correction value and generating second image data from the image data captured at the non-emission timing of the flash unit based on the corrected second white balance correction value;

calculating a luminance component of external light and a luminance component of light from the flash unit based on a luminance value of the image data captured at the non-emission timing of the flash unit and a luminance value of the image data captured at the light-emission timing of the flash unit; and mixing the first image data and the second image data based on a ratio of the luminance component of external light and the luminance component of light from the flash unit.

7. An image processing apparatus comprising:

a calculation unit configured to calculate a first white balance correction value for image data captured at light-emission timing of a flash unit and to calculate a second white balance correction value for image data captured at non-emission timing of the flash unit;

an acquisition unit configured to acquire a focal length of a photographic lens corresponding to the image data captured at the light-emission timing of the flash unit;

a correction unit configured to correct at least one of the first white balance correction value and the second white balance correction value so that a difference between the first white balance correction value and the second white balance correction value decreases as the focal length of the photographic lens increases;

a generation unit configured to generate first image data and second image data by using the first white balance correction value and the second white balance correction value output from the correction unit from the image data;

a component calculation unit configured to calculate a luminance component of external light and a luminance component of light from the flash unit based on a luminance value of the image data captured at the non-emission timing of the flash unit and a luminance value of the image data captured at the light-emission timing of the flash unit; and a mixing unit configured to mix the first image data and the second image data based on a ratio of the luminance component of external light and the luminance component of light from the flash unit.

8. The image processing apparatus according to claim 7, further comprising:

a color temperature difference calculation unit configured to calculate a difference in color temperature between the first white balance correction value and the second white balance correction value; and a motion amount calculation unit configured to calculate a motion amount of an object or an image capture apparatus, wherein the correction unit corrects at least one of the first white balance correction value and the second white balance correction value so that a difference between the first white balance correction value and the second white balance correction value decreases, in a case where the difference in color temperature or the motion amount of an object or an image capture apparatus satisfies a predetermined condition.

* * * * *